C. H. SMOOT.
SPRING SUSPENSION FOR VEHICLES.
APPLICATION FILED MAY 22, 1915.
1,199,123.
Patented Sept. 26, 1916.
2 SHEETS—SHEET 1.
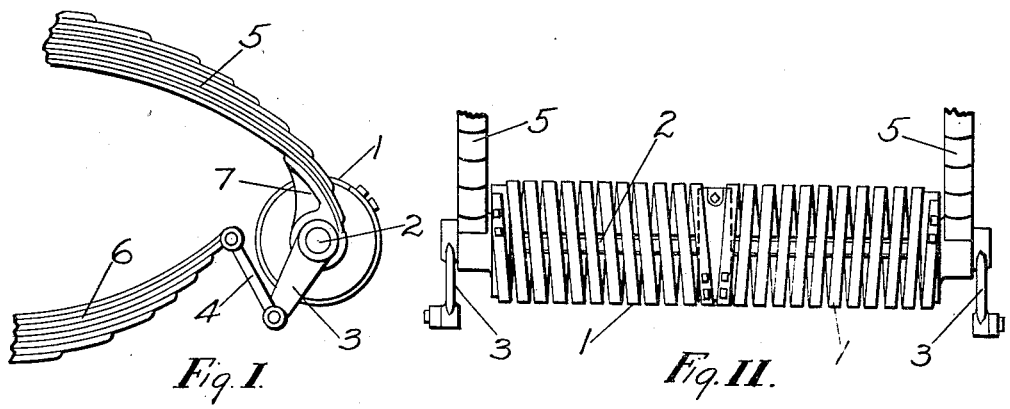
Fig. I.          Fig. II.
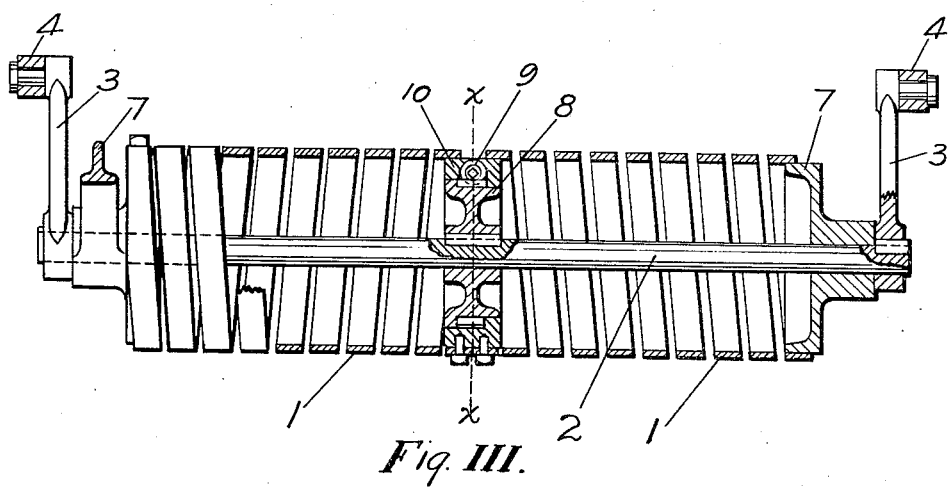
Fig. III.
WITNESSES:
INVENTOR
Charles H. Smoot C. H. SMOOT.
SPRING SUSPENSION FOR VEHICLES.
APPLICATION FILED MAY 22, 1915.
1,199,123.
Patented Sept. 26, 1916.
2 SHEETS—SHEET 2.
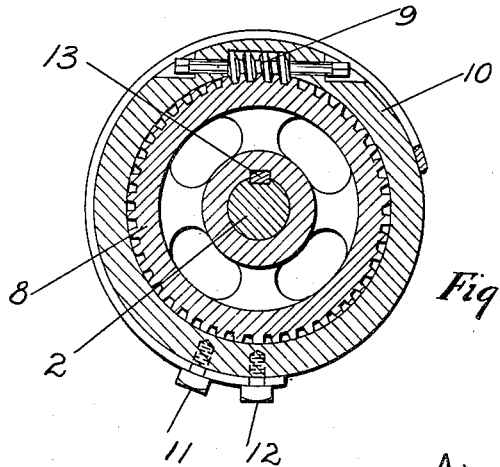
Fig. IV.
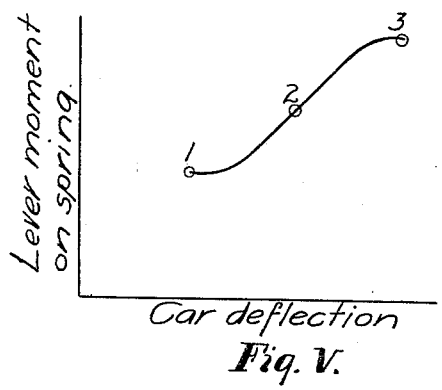
Fig. V.
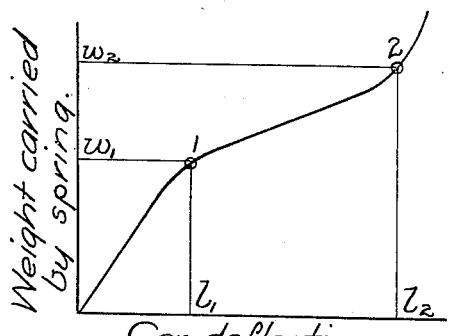
Fig. VI.
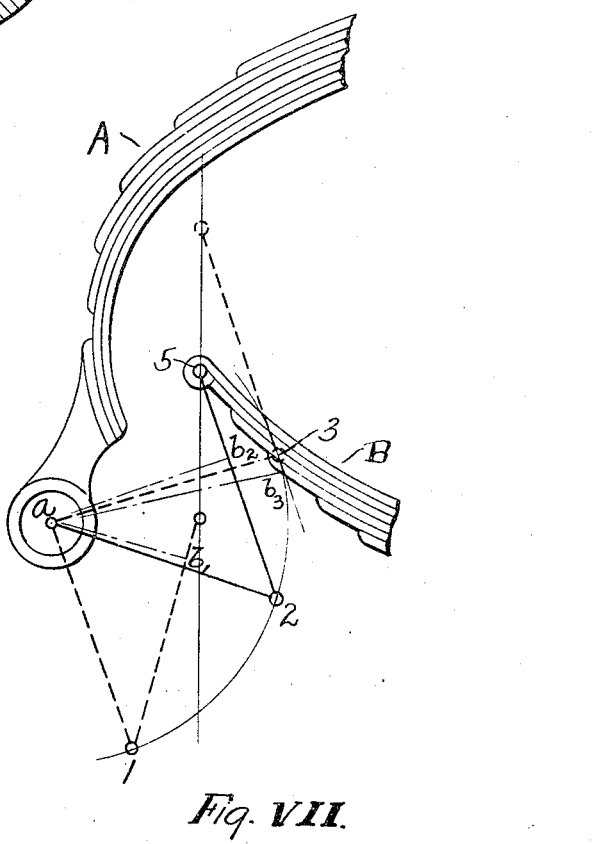
Fig. VII.
WITNESSES:
INVENTOR
Charles H. Smoot
BY
ATTORNEY

UNITED STATES PATENT OFFICE.

CHARLES H. SMOOT, OF NEW YORK, N. Y., ASSIGNOR TO RATEAU BATTU SMOOT COMPANY, OF NEW YORK, N. Y., A CORPORATION OF NEW YORK.

SPRING SUSPENSION FOR VEHICLES.

1,199,123.  Specification of Letters Patent.  Patented Sept. 26, 1916.

Application filed May 22, 1915. Serial No. 29,731.

*To all whom it may concern:*

Be it known that I, CHARLES H. SMOOT, a citizen of the United States, whose post-office address is 90 West street, New York city and State, have invented certain new and useful Improvements in Spring Suspension for Vehicles, which improvements are fully set forth in the following specification.

This invention has for its object the provision of improved means by which the rolling motion of a vehicle is comprised under certain predetermined limits, and the vertical motion is allowed to be made as great as can reasonably be desired. As vehicles are suspended now, with a slow vertical motion corresponds a slow rolling motion. In order to design a vehicle which is stable and soft on its springs, the designer is obliged to compromise both ways in order to strike a reasonable medium. The vertical, or up and down, motion of a vehicle should be much slower than the rolling motion. The spring action should, therefore, be much softer for vertical displacements of the vehicle body than is requisite to take care of the rolling motion. By means of my invention it is possible to obtain as great a vertical resiliency as can reasonably be desired, and as soft a rolling resiliency as is requisite for the proper operation of the vehicle.

Figure 1 shows a side elevation of my apparatus applied to the spring system commonly used on automobiles. Fig. 2 shows my apparatus in horizontal elevation from the rear. Fig. 3 shows my apparatus in vertical cross section. Fig. 4 shows a cross section through X X of Fig. 3. Fig. 5 is a curve of lever moments acting to twist the coil springs 1, 1 of Fig. 2. Fig. 6 shows a curve describing the relation between upward and downward deflection of the car and the weights producing this deflection. It will be noted for the deflection $l_1$ the corresponding weight is $w_1$, and for the deflection $l_2$ the corresponding weight is $w_2$. This curve illustrates the softening action of the spring, due to the variation in lever moments between the points corresponding to deflections $l_1$ and $l_2$. The increase in weight from the value $w_1$ to the value $w_2$ is relatively small, in comparison to the increase in deflection between points $l_1$ and $l_2$. In other words, within this range a small increase in weight produces a relatively large deflection. In this way the spring action is softened within this range of deflection. Fig. 7 shows in elevation diagrammatically three different positions of upper and lower spring, and illustrates the action of the shackles and lever moments by means of which the softening of the spring is accomplished, as illustrated in Fig. 6. The springs are shown in their mean position, A being the upper spring and B the lower spring. Line $a$—2 represents the lever arm 3 of Fig. 1. Line 2—5 represents the shackle 4 of Fig. 1. For a greater deflection of car the lever arm, represented by line $a$—2, takes the position $a$—3, and for a higher position of the car the lever arm takes the position $a$—1.

In Figs. 1, 2, 3 and 4 the reference numbers employed refer to the same parts of my apparatus.

In Fig. 1, 1, 1 are coil springs, 2 is a transverse shaft, 3 is a lever affixed to the transverse shaft 2, 4 is a supporting shackle, 5 is the upper half of a leaf spring suspension, 6 is the lower half of the leaf spring suspension, and 7 is a supporting member, to which are affixed the upper ends of the coil spring 1.

In Fig. 2, both coil springs 1, 1 are shown.

In Fig. 3, 8 is a worm wheel which is affixed to shaft 2, 9 is a worm engaging in this wheel, 10 is a ring in which is fastened the worm and to which are affixed the middle ends of the coil springs 1, 1.

In Fig. 4, 2 refers to the transverse shaft, 13 is a key securing the shaft to the worm wheel 8, 9 shows the worm engaging the wheel, 11 and 12 are the bolts securing the ends of coil springs 1, 1 to ring 10. When the spring suspension yields under road action, spring 6 moves upward in reference to spring 5 and through the action of shackle 4 the lever 3 is rotated with the shaft 2, causing the springs 1, 1 to be wound more tightly. The cumulative action of the coil springs 1, 1 is partially overcome by an increase in lever moment brought about by the relative positions of shackle 4 and lever 3, which produces an increasing leverage for twisting the springs 1, 1, associated with an increasing degree of torsion, so that the more the springs are twisted, the greater becomes the leverage to produce the twisting.

This compensates in part for the cumulative action and allows a relatively stiff spring to act as though it was a very soft spring, whereby the natural period of oscillation of the vehicle may be made as low as desired. The levers 3, 3, are firmly affixed to the shaft 2. At the center of shaft 2 are affixed both of the free ends of the coil springs 1, 1. The middle ends of the coil springs 1, 1 are, therefore, obliged to move directly with the shaft 2. The outer ends of the coil springs 1, 1 are affixed to the supporting members 7, 7, which are rigidly attached to the upper leaf springs 5, 5, and in the absence of the leaf springs 5, 5 would be affixed to the frame of the vehicle. After yielding under deflection, the levers 3, 3 rotate upward, coiling the springs 1, 1 more tightly around the shaft 2.

To illustrate the lever system by means of which the spring action is softened, I have shown in Fig. 5 the curve of lever moments acting to twist the coil springs 1, 1. On the curve, point 1 corresponds to the car body in its extreme uppermost position, point 2 the car body in average position and point 3 in the extreme lowest position. As will be seen, the lever moment is greatest at point 3, less at point 2 and still less at point 1, consequently the reaction effort of the spring, which is greatest for position 3, has opposed to it a maximum lever moment and, conversely, for position 1 the reaction of the spring has opposed to it the smallest lever moment, at which point the spring produces its least reaction. As the coil spring becomes more tightly wound up, the leverage through which the winding force acts is increased, so that the winding force does not need to increase as rapidly as the extent of the winding.

I have illustrated in Fig. 7 the relative position of arms and shackles and the means whereby the leverage for twisting the springs is increased with its deflection. The points in Fig. 7 numbered 1, 2 and 3 correspond to points of the same numbers in Fig. 5, thus point 1 represents the car body in its uppermost position, point 2 the average position of the car body and point 3 the car body deflected down its maximum amount. The lever arm through which the weight of the car twists coil springs 1, 1 is a perpendicular distance annoted $ab1$, $ab2$, and $ab3$, this being the least distance between the shackles and the spring center. It will be seen that the lengths of the virtual lever arms increases continually, $ab1$ being the smallest value, corresponding to position 1, and $ab3$ the greatest value, corresponding to position 3.

By means of my apparatus a small weight of metal in the coil springs may be made to produce a soft spring suspension which would otherwise require a very large lever or direct-acting coil spring. Furthermore, the combined action of the two springs, by virtue of their attachment to the car, obliges them to act largely in sympathy on either side of the car, thus for rolling motion the coil springs do not come into play, since the shaft 2 is rigid and the arms 3 are, therefore, held parallel to each other. This prevents the coil spring yielding under rolling motion, the torsion produced by the roll being entirely absorbed by the shaft 2. For up and down oscillation, however, the levers 3, 3 remain parallel one to the other, the deflection of the device being equal on either side of the car, and coil springs 1, 1 are wound and re-wound as may be necessary to properly perform their function.

By the addition of this device to a vehicle such as an automobile its natural period of oscillation may be reduced and a softer spring system employed, but the desired lateral rigidity may be maintained, as only the leaf springs 5 and 6 customarily employed on such vehicles can yield for the rolling motion, while for the up and down motion the entire spring system has free play and the yielding of the springs is a composite of the yielding in the leaf springs 5 and 6 and the coil springs 1, 1. For vehicles which have no upper leaf spring affixed to the frame my apparatus is equally applicable, it being sufficent that the journal supporting members 7, 7 be affixed to a suitable portion of the vehicle frame.

The initial tension of coil springs 1, 1 may be regulated through means of the worm 9 engaging worm wheel A. The rotation of worm 9 in one direction drives clockwise the worm wheel A and in the opposite direction counter clockwise in such a way that springs 1, 1 are coiled tighter or loosened.

Fig. 6 shows the spring action in combination with the lever and link system previously described. By virtue of the action of the leverage on the spring, the spring characteristic is modified from the usual straight line to the characteristic shown in Fig. 6, in which it will be seen that with small car deflections up to point 1, the spring action is stiff, a small deflection corresponding to a large weight. Between points 1 and 2 the reverse is the case, a large deflection corresponding to a small change of weight, and for deflections greater than that of point 2, the spring system again becomes stiff. Between points 1 and 2 the increasing resistance of the spring to deflection is opposed and in part overcome by the increase in leverage brought to bear against the spring. It is this increase in leverage which makes the spring action softer between points 1 and 2 than elsewhere. Approximately the deflections from point 1 to point 2 of Fig. 6 correspond to the deflection between points 1 and 3 of Fig. 7. In Fig. 6 the car deflection for point 1 is represented to scale by abscissæ $l_1$ and for point 2 by $l_2$. The deflection represented by the difference between $l_1$ and $l_2$ is the car deflection during which the spring action is soft as defined by the relative values of the ordinates $w_1$ and $w_2$.

Fig. 5 is a curve showing the variation in lever moment acting to produce torsion in the coil spring. A relatively small deflection of the car when in mean position; i. e., in the neighborhood of point 2 on the curve; produces a considerable change in lever moment, while at the upper and lower positions of the car, represented by points 1 and 3, a change in car deflection from vertical position makes very little difference on torsion spring. This is illustrated in the curve where the curve slopes up abruptly. A small change in deflection makes a large change in lever moment, and where the curve is more nearly horizontal a small change in car deflection makes but little change in lever moment.

It will be readily seen that my invention applies in the event that for one of the springs 5 or 6 of Figs. 1 and 2 is substituted a rigid, non-elastic support; for instance, in the event that spring 6 of Fig. 1 is a cantaliver spring and 5 is a rigid support.

I claim as new:

1. In a vehicle suspension springs located on each side of the vehicle responsive to up and down motion and to rolling motion, a rotary shaft held substantially at both extremities by said springs, means to rotate said shaft controlled by the displacement of said springs and coil springs acting in torsion and responsive to the rotation of the rotary shaft.

2. In a vehicle suspension two spring equipments, one located on the right-hand side of the vehicle and one on the left-hand side of the vehicle, said spring equipment comprising an upper and a lower spring both responsive to rolling and up and down motion of said vehicle, a rotary shaft connected by means of journals to the upper springs of said spring equipment and connected by means of a lever and shackle to the lower springs and resilient means opposing the rotation of said shaft.

3. In a vehicle suspension a rotary shaft held substantially at both extremities in journals located at the right and left hand sides of said vehicle, two springs located one at the right and one at the left hand side of said vehicle connected respectively to both extremities of said shaft by means of a lever and shackle, coil springs having their axis of winding substantially parallel to said rotary shaft and opposing in torsion the rotation of the rotary shaft.

4. In a vehicle suspension springs located respectively one on the righthand side and the other on the lefthand side of the vehicle, levers connected by means of shackles respectively to the right and left hand springs, a shaft held in journals and rigidly connected to the levers, coil springs held rigidly at one extremity to the shaft and at the other to the journals and opposing the rotary motion of the shaft.

5. In a vehicle suspension springs located on the righthand side and lefthand side of the vehicle, a shaft extending across said vehicle and journaled thereto, levers attached rigidly to said shaft and to said springs by means of shackles, coil springs held rigidly at one extremity to the shaft and opposing in torsion the efforts transmitted by the springs through the levers.

6. In a vehicle suspension springs located respectively one on the right hand and the other on the left hand side of the vehicle, levers connected by means of shackles respectively to the right and left hand springs, a shaft held in journals and rigidly connected to the levers, coil springs held rigidly at one extremity to the shaft and at the other to a point rigidly connected to the journals, said coil springs opposing the rotary motion of the shaft.

In witness whereof I have hereunto subscribed my name this 21st day of May, 1915.

CHARLES H. SMOOT.

Witnesses:
C. S. BROOKS,
L. L. BATTU.